Aug. 10, 1971     KIYOSHI INOUE     3,598,566
POWDER ACTIVATION
Filed Dec. 27, 1967     2 Sheets-Sheet 1
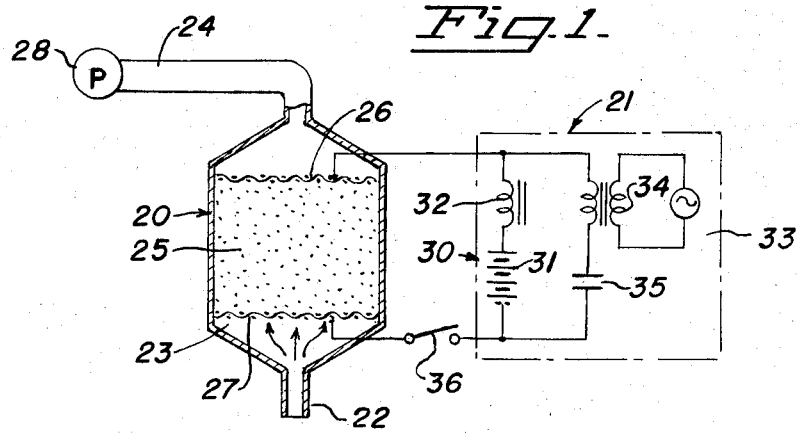
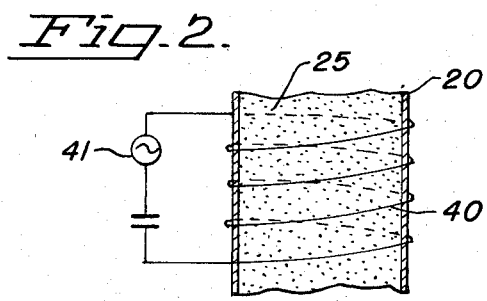
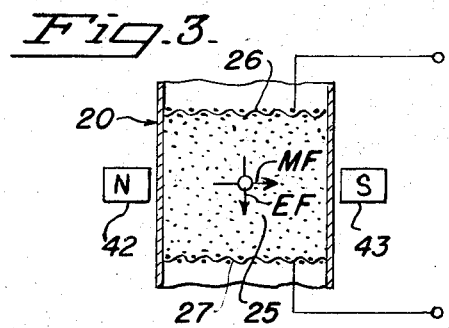
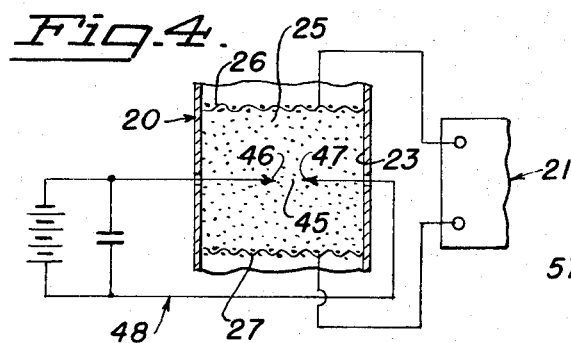
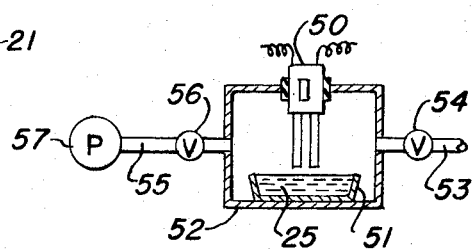
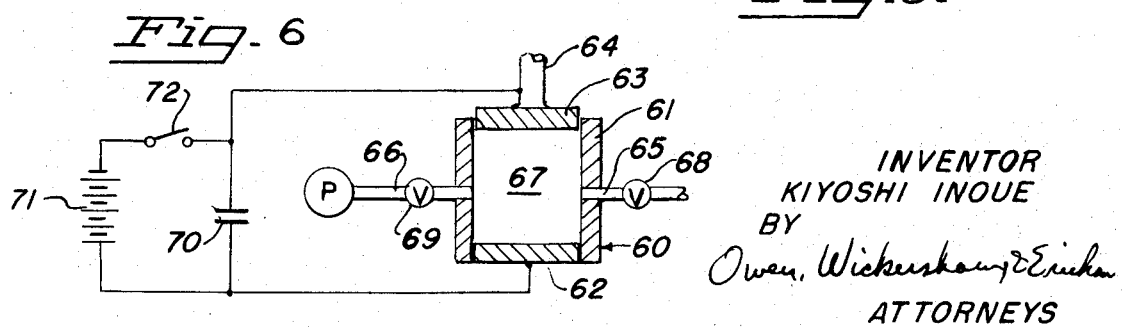
INVENTOR
KIYOSHI INOUE
BY
Owen, Wickersham & Erickson
ATTORNEYS

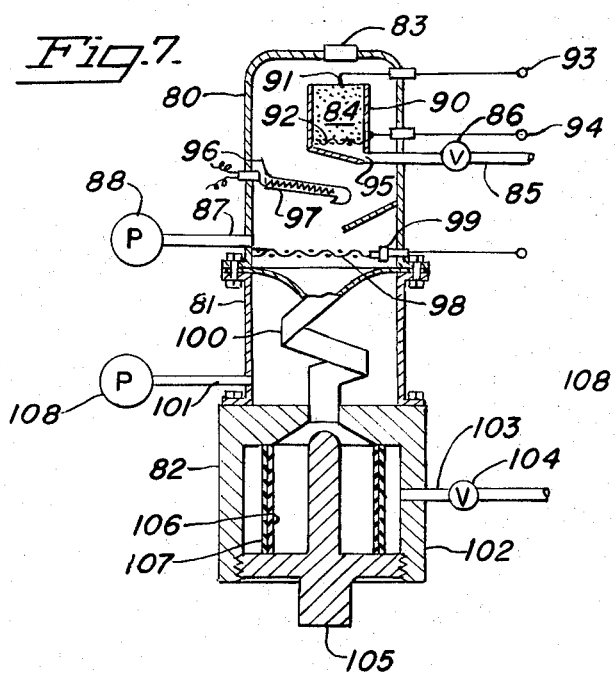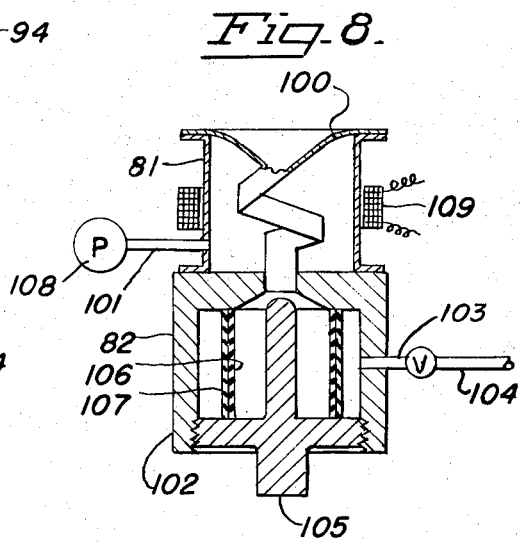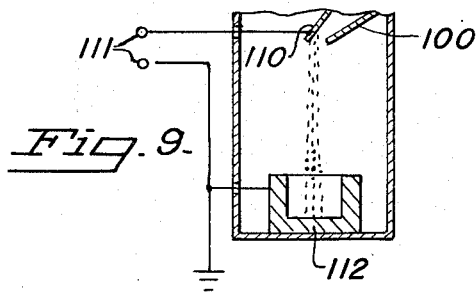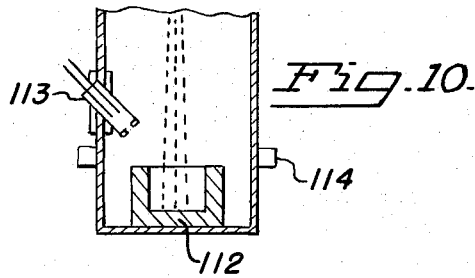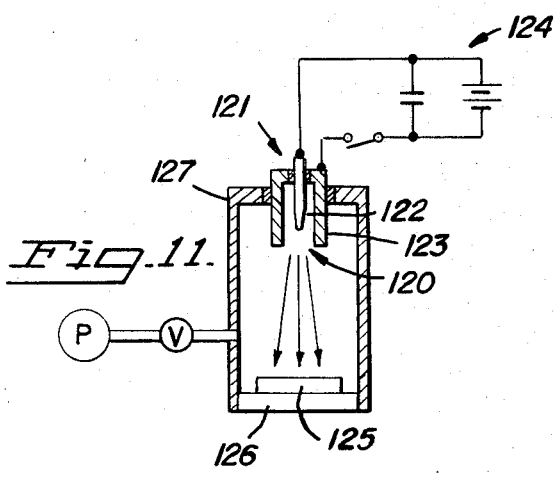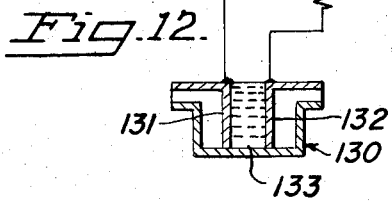

United States Patent Office 3,598,566
Patented Aug. 10, 1971

3,598,566
POWDER ACTIVATION
Kiyoshi Inoue, 182 3-chome, Tamagawayoga-machi,
Setagaya-ku, Tokyo, Japan
Filed Dec. 22, 1967, Ser. No. 692,960
Claims priority, application Japan, Apr. 26, 1967,
42/26,740, 42/26,741; June 3, 1967, 42/35,640;
Dec. 1, 1967, 42/77,042
Int. Cl. B22f 9/00
U.S. Cl. 75—.5                                    13 Claims

ABSTRACT OF THE DISCLOSURE

Activation of metallic powders by subjecting the powder to bombardment with electrons, ions, or molecules in an inert or reductive atmosphere. Improved densities result in sintering, as do improved catalytic actions. Simultaneous pulverization of course particles or bodies is also achieved where desired. The pretreatment is, in some instances, combined with loading the activated particles directly into a mold, for compaction or sintering, preferably with some additional activation, all done in an integrated system.

---

This invention relates to metallic powder activation. More particularly, it relates to an improved method of and apparatus for the removal of impurities such as oxide film and moisture, as well as other contamination, from the surfaces of discrete metallic particles by utilizing impact energy. The result is to modify such surfaces to an activated powder that may be used for cold or warm pressing to form densified green compacts or for hot pressing to produce coherent sintered objects or for interparticle chemical reactions or for catalyst.

Conventionally, two powder activation processes have been available: (a) heating in a reductive atmosphere and (b) reaction with particular chemical agents. Each of these processes has had only limited efficiency.

The present invention comprises introducing powder into an inert or reductive atmosphere and there subjecting it to bombardment with high-energy impact force by electrons, ions, or molecules or combinations thereof.

Electron and ion bombardment for purposes of this invention may be effected through an electrical space discharge, e.g., corona or glow discharge, created through the inert or reductive medium between a pair of electrodes or among adjacent or close discrete particles fluidized in the inert or reductive medium. Molecular bombardment, probably with some accompanying ion bombardment, may be accomplished by shock waves, such as result from detonation in a shock gun, as by spark generation of impulses.

I have discovered that the electron, ion or molecular bombardment advantageously removes oxide films, moisture, adsorptive gaseous particles and other impurities normally firmly adherent to and coated on the substrate of each discrete particle, apparently by decomposing these impurities into gaseous substances, thereby cleaning the surfaces of the particles. In addition to removal of the coated films by the action of such bombardment, marked increases of surface tension and free energy of the cleaned surfaces are achieved as a result of the formation of strain and distortion. By continuous circulation of the inert or reductive medium, i.e., its replenishment by introducing fresh inert or reductive gas into and evacuating the contaminated atmosphere from the treatment chamber in which the bombardment is effected, the decomposed gaseous impurities are prevented from recombining with the material forming the particle substrate.

The power supply for the production of effective corona and glow discharge may be a source of DC, AC, DC-pulse or pulsating current. Experimentation has demonstrated that a high-frequency and unidirectional current is preferable in promoting powder activation. An electron beam or ion beam gun may be employed.

In accordance with another aspect of the invention, simultaneously with activation, pulverization of relatively large-sized particles or bodies (wire, block, etc.) into smaller sized particles can be effected by means of impulses of discharge energy. For this purpose, fluidized powder may be held between a pair of electrodes in a non-oxidizing atmosphere so as to be subjected to inter-particles discharges of impulsive character under the external application of a succession of impulses across the electrodes. Alternatively, a spark gap of relatively small spacing may be surrounded by floating powder so that upon the generation of impulse discharge at the gap, mechanical collisions may be induced among particles and propagated radially out from the spark gap. The particle size resulting from such pulverizing may be controlled by regulation of the discharge energy.

The present invention also provides an improved powder loading system wherein powder is pre-treated as described above, and is thereafter immediately loaded in a mold for compaction or sintering. Such a system offers the opportunity for further bombardment and purification during loading.

Other objects and advantages of the invention will appear from the following description of some preferred embodiments.

In the drawings:

FIG. 1 is a diagrammatic view of a system embodying the invention, including a treatment chamber shown in elevation and in section and an electrical circuit.

FIG. 2 is a fragmentary and diagrammatic view of a portion of a modified form of treatment chamber of the invention with a different means for applying the electrical circuit to the chamber.

FIG. 3 is a view similar to FIG. 2 of another modified form of the invention, employing a magnetic field in combination with the apparatus of FIG. 1.

FIG. 4 is a view similar to FIG. 1 of another modified form of the invention, employing a spark-discharge gap between the electrodes of FIG. 1.

FIG. 5 is a diagrammatic view of a portion of another modified form of the invention, employing an electron or ion beam gun.

FIG. 6 is a view similar to FIG. 1 of another modified form of the invention which also pulverizes material into small particles.

FIG. 7 is a diagrammatic view in elevation and in section of a modified form of the invention which provides an integrated system for both pre-treating the material and loading it into a mold, as for sintering.

FIG. 8 is a fragmentary view of a portion of the apparatus of FIG. 7 with a modification of one portion thereof.

FIG. 9 is a diagramamtic view of a modified form of the bottom of the apparatus of FIG. 7.

FIG. 10 is a view like FIG. 9 of another modified form of the bottom of the aparatus of FIG. 7.

FIG. 11 is a diagrammatic view of a system also embodying the principles of the invention for treating the powder with a shock wave.

FIG. 12 is a diagrammatic view of a fuel cell in which material treated by the system of FIG. 11 may be used after sintering.

The system shown in FIG. 1 comprises a treatment chamber 20 and a power supply 21. The chamber 20 is provided with an inlet 22 for introducing a non-oxidizing, i.e., an inert or reductive atmosphere into a treatment region 23 of the chamber 20 and an outlet 24 communicating with a conventional vacuum pump 28 for evacuating contaminated atmosphere from the chamber 20. A powder 25 to be activated is fluidized by the introduced gas within the treatment region 23 and contained between retaining screens 26 and 27, which form a pair of electrodes for the electrical-discharge powder activation process.

The power supply 21 is connected across the screen electrodes 26 and 27 and, in this embodiment, comprises a source 30 of unidirectional current of relatively high amperage capable of effecting sufficient glow or corona discharge between the screen electrodes 26 and 27 (the source 30 may be a battery 31 in series with a high-energy coil 32) and a source 33 of high-frequency AC of relatively low amperage adapted to promote high-frequency discharge among the particles of the powder 25. The AC source 33 may be coupled to the DC source 30 and the electrodes 26 and 27 through a transformer 34 and a condenser 35. When discharges are developed between the electrodes 26 and 27 and among close discrete particles of the powder 25, through the gaseous medium, each of the discrete particles is subjected to electron and ion bombardment with resultant impact forces, thermal effect and induced interparticle collisons of relative particles. After sufficient activation of the powder 25, the power supply 21 may be disconnected from the electrodes 26 and 27 as by a switch 36.

In the modified system shown in FIG. 2 the chamber 20, which may be similar to that illustrated in FIG. 1, is surrounded by a winding 40 connected across a high-frequency AC or pulse source 41. In operation, the powder 25 is exposed to pole-less high-frequency discharge created through the inert or reductive atmosphere among discrete particles floating in that atmosphere.

FIG. 3 shows a modified system of the invention employing a magnetic field, either static or movable, either unidirectional or alternating, as across poles 42 and 43, in combination with the electrical field produced by the power supply 21 of FIG. 1. As shown, the magnetic field MF may be at right angles to the electrical field EF, and is designed thus to deflect the flow lines of bombarding electrons and ions or to induce additional movements of the discrete particles of the powder 25 when it is charged or magnetized, the exact operation depending on specific procedures desired to augment the activation effect.

FIG. 4 shows a modified system wherein a spark-discharge gap 45 is provided in the treating area 23 between screen electrodes 46 and 47, and a power supply 48 produces repeated impulses which are propagated through the surrounding inert or reductive atmosphere and the particles of power 25 fluidized therein. Thus, shock-like mechanical interparticle collisions are caused which facilitate the effect of the electrodes 26 and 27. I have found that such mechanical-force impulses effectively impart distortions and strains to the surface of each particle, thereby giving storage of energy thereat that raises the surface energy. In this embodiment, however, the mechanical impulse source may be replaced by other means.

FIG. 5 illustrates yet another embodiment of the invention, in which an electron or ion beam gun 50 is substituted for the glow or corona discharge means described in previous embodiments. Powder 25 to be activated is placed in a container 51 within a treatment chamber 52, which is provided with an inlet duct 53 having a stopcock or valve 54 for introducing an inert gas into the chamber 52. An outlet duct 55 has another stopcock 56 connected with a vacuum pump 57 for maintaining the interior of the treatment chamber 52 at a predetermined low pressure. The container 51 for retaining the powder 25 may be vibrated at a sonic or ultrasonic frequency to agitate the powder 25 in a desired manner.

FIG. 6 shows an embodiment of the invention for effecting the pulverization of relatively large bodies, i.e. particles, wires, or chunks, into smaller sized particles, simultaneously with the activation thereof. In this system, a treatment chamber 60 is provided with a side wall 61 composed of insulating material such as ceramic, and a pair of electrodes 62 and 63, the electrode 63 being movable by a rod or a shaft 64. The side wall 61 of the chamber 60 is provided with an inlet 65 for supplying and an outlet for evacuating an inert or reductive atmosphere into and from the chamber 60, in which powders 67 is fluidized. An inlet valve 68 and an outlet valve 69 control flow. Connected across the electrodes 62 and 63 is a charge and discharge capacitor 70, which is connectable across a DC source 71 by a switch 72, for establishing a single impulse discharge or repeated impulse discharges in the chamber 60 between the electrodes 62 and 63. In practice, upon closing the switch 72 while maintaining the interior of the chamber 60 at a predetermined pressure, a spark discharge is developed across the electrodes 62 and 63. If the powder 67 is conductive material, it provides a conductive path to create dispersive spark discharges between adjacent or nearby particles. If the powder is of dielectric property, charges formed on discrete particles similarly cause the dispersion of electrical energy. In any case, the interparticle spark discharges thus created are sufficient to produce impact force due to electron and ion bombardments, thermal energy, and spark discharge pressure which, in combined fashion, decompose the contamination coated on the discrete particles of the material 67 and, in addition, pulverize these particles into smaller pieces, imparting to the smaller particles distortions or other energy storage. It will be apparent that the present embodiment affords particular advantage in the metallurgical field, in that only a single process is required to prepare activated powder from any raw material. As mentioned previously, the size of pulverized particles can be controlled by the amount of the discharge enregy, the pulse width, and/or other discharge parameters.

FIG. 7 represents an integrated activation system and an improved powder-loading system, wherein the principles and steps of the above-described method are adapted to perform the activation of raw powdery material and also for loading the activated powder into a mold for compacting or sintering. The system essentially comprises three parts: an activation treatment chamber 80, an evacuation chamber 81 and a powder compacting unit 82. The powder compaction unit 82 in this case is shown to employ a so-called rubber press, although the system is adapted to any type of compaction or sintering process.

The activation chamber 80 is provided with a raw-material inlet 83, through which unactivated powder 84 is introduced, a gas inlet 85 with a valve 86 for delivering an inert or reductive atmosphere into the chamber 80, and a gas evacuating duct 87 communicating with a vacuum pump 88. A discharge treatment zone 90 is provided with a needle electrode 91 and a screen electrode 92 for exposing the fluidized powder 84 of raw material to corona and/or glow discharge in the manner described hereinbefore, while inert gas comes in through the conduit 95. For this purpose, terminals 93 and 94 are supplied with any suitable discharge power supply.

After treatment by electron and ion bombardment in the zone 90, the powder 84 is fed to a heating stage 96, at which contamination, if any, remaining on the particles can be removed by heat emanating from a heater 97. Thereafter, the treated powder is fed to a vibrating screen 98, preferably equipped with a sonic or ultrasonic vibrator 99, which preferably sets up a frequency ranging from 100 Hz. to 200 kHz. The vibrating screen 98 forms means for separating contaminated or decomposed substances from the particles and also serves as a filtering means. The filtered-out particles and the decomposed and separated gaseous substances are then evacuated through the duct 87 by the vacuum pump 88. In this connection, the pressure within the activation chamber 81 can be reduced to $10^{-2}$ to $10^{-5}$ mm. Hg without decreasing activation efficiency.

Disposed under the vibrating screen 98 is a feeder tube 100, preferably having a spiral configuration, through which the activated powder is progressively fed. A conduit 101 may communicate with a vacuum pump 108 to keep the zone 81 also at a low pressure. The feeder 100 is preferably made porous, so that the powder passing therethrough may be completely de-gassed by the negative pressure in the zone 81 applied via the conduit 101. The lower end of the conduit 101 introduces the powder into the compaction unit 82.

The unit 82 in this instance may comprise an external vessel 102 provided with a fluid inlet 103 having a valve 104. A mandrel 105 forms a solid die, and one or more deformable membranes 106 and 107 form another die. The membranes 106 and 107 may be composed of natural rubber, synthetic rubber or other elastomeric material and, alternatively, may be deformable but non-elastic material. Upon sufficient loading of the powder that has been cleaned and activated in accordance with the present invention, hydraulic or pneumatic fluid may be introduced through the inlet 103 into the cavity formed by the side wall 102, the die 105 and the deformable membranes 106 and 107, to compress the loaded powder substantially isostatically.

In FIG. 8 the system is the same as in FIG. 7, except that a magnetic field is applied by a magnet 109 to the activated powder in the evacuating zone 81 at the de-gassing stage, or at the loading stage. The magnetic field, whose strength may be in the range from 50 to 5000 gauss, depending on the specific application, is here provided to cause disturbance in the movement of the powder being fed along the spiral passage 100, thereby promoting inter-particle collision and repulsion, which further augment the de-gassing effect. The magnetic field is also advantageous to achieve closer packing of the loaded powder in the mold 83. This system is particularly suited for powders of magnetizable material.

FIG. 9 diagrammatically illustrates a special powder-loading system adapted to be used with the system of FIG. 7. In this embodiment, the outlet 110 of the feeder 100 is used to form an electrode connected to a power supply 111, for establishing an electrostatic field in the region where the activated powder is delivered under gravitational force into a mold 112 which forms the counterelectrode. The electrostatic field is used to pre-charge the powder passing through the outlet 110 of the feeder 100 with the accompanying electrical space discharge, here a corona discharge, and to accelerate uniformly the speed of the powder as it falls toward the mold 112 with increased coulomb force. Thus, the loading or piling state of the powder in the mold 112 can be controlled by the intensity of the electrostatic field.

FIG. 10 shows another powder loading system practicable with the present invention. This embodiment employs an electron or ion beam gun 113 for accomplishing additional powder activation when the powder is packed in the mold 112. A focusing coil 114 is used to accelerate the electron beam. It has been found that an electron beam of about 5 to 150 milliamperes and 5 to 150 volts is satisfactory.

Another aspect of the invention shown in FIG. 11, involves the utilization of a shock wave or pressure for powder activation. In practice with the present improvement, a shock gun 120 is provided inside with an impulse spark generator 121 as a detonation source, comprising a needle electrode 122 and a tubular gun electrode 123 and a spark generator circuit 124. Opposite the gun 120 is a mass 125 of discrete particles or a solid body to be activated supported upon a retainer 126, such as a plate, all in an evacuated treatment vessel 127. Upon ignition, the gun 120 exerts impulsive pressure to the mass 125 to be activated. Alternatively, the discrete particles may be propelled by impulsive pressure to impinge with ultrasonic velocity on a rigid target. In either case, the resultant particles have shown high degrees of activation. Powder so treated, when subsequently sintered and used as a battery electrode, has shown high efficiency.

FIG. 12 shows a fuel cell 130 employing electrodes made from actuated particles, namely an electrode 131 of sintered silver for the oxygen electrode and an electrode 132 of sintered nickel for the hydrogen electrode. An electrolyte 133 lies in between.

The invention is further illustrated by the following specific examples.

EXAMPLE I

Nickel powder of a fineness of 250 mesh was activated in argon atmosphere (as in FIG. 1) by exposing it to 60 kv. glow discharge for 5 minutes in accordance with the present invention. To sinter the resulting activated powder in hydrogen atmosphere, a pressure of only about 450 kg./cm.$^2$ and a sintering period of only about 24 minutes were required. In comparison, the non-activated powder required a pressure of 1,850 kg./cm.$^2$ and a sintering period of 43 minutes.

EXAMPLE II

To obtain oxidized powder by heating non-activated 60-mesh beryllium powder in a carbon-dioxide atmosphere, required a heating temperature of about 621° C. Activated powder of the same was prepared, in accordance with the present invention, by exposing it in a hydrogen atmosphere to 85 kv. glow discharge for 5 minutes; this activated powder was oxidized in carbon dioxide at only about 140° C.

EXAMPLE III

Beryllium powder of 100 mesh fineness was pre-treated by passing it only through the de-gassing stage 81 of FIG. 7 under 10$^{-4}$ mm. Hg evacuation, while eliminating the discharge treatment stage 80. The treated powder was compacted into a green compact and the latter was sintered to a body having 97% density, 10% increase in density over those obtained without the de-gassing treatment.

EXAMPLE IV

Beryllium powder, again 100 mesh, was pre-treated by exposing it to glow and corona discharge through the stage 80 of FIG. 7 and then treated as in Example III. With this powder thus activated, the compaction pressure required was reduced to one-twentieth of the amount formerly required, and the density of the sintered product was elevated to 99%. It has been found that the glow and corona discharge can be altered by electron or ion beam or by impulsive discharge, as described thereinbefore.

EXAMPLE V

Beryllium powder of 100 mesh fineness was activated by exposing it to electrical discharge through the stage 80 of FIG. 7 and thereafter was subjected to an electrostatic field of 150 kv. through the stage of FIG. 9, as it was packed in the mold 112. The packed density of the powder was identical to that obtained with a mechanical press of 1.5 tons/cm.$^2$ pressure. In another instance, beryllium powder of the same mesh was, upon the discharge activation, subjected to electrostatic field of 40 kv. strength. The packed density of the loaded powder in this case was identical to that obtained with a mechanical press of 20 kg./cm.$^2$ pressure.

EXAMPLE VI

For use in fuel cells as electrode material, 400 mesh nickel powder was processed according to FIG. 11 with a shock energy of 11,000 joules, which is about four Mach. It was given three shocks at a distance of ten centimeters and then sintered into a plate one by twenty by twenty milliammeters having a density of 70%.

Three hundred mesh silver was given the same shock treatment and also compressed to 70% density in a plate one by twenty by twenty milliammeters.

These plates were then used in the fuel cell of FIG. 12 with the nickel side to oxygen, the silver side to hydrogen, and with potassium hydroxide as the electrolyte. (Calcium oxide was used on both plates prior to their use in the fuel cell, for activation only.) An exact duplicate of the fuel cell employing sintered nickel and silver which were made from the same powder but by ordinary sintering was also made and was found to produce a voltage of 0.9 v. and a current of 120 milliamps in the fuel cell. Under the same conditions the material activated by the shock energy produced a potential of 1.1 volts and a current of 340 milliamps.

In addition to the inert gases named in the examples, nitrogen, helium, neon, krypton, xenon, and admixtures of two or more with each other or with argon or carbon dioxide may be used. Hydrogen is the best reducing gas, when that is desired, especially hot hydrogen. Reduced-pressure air, e.g., near vacuum, can be used. Which gas is best depends partly on the powder being treated. The term metallic powder is intended to include not only actual metal powders but also metal carbides, carbon, other metallic compounds, even in some instances metal oxides, nitrides, sulfides, etc. It will be apparent that the process may be varied to suit the exact material; for ex-example, reducing atmospheres are desirable sometimes and not others, for example where oxides are a desired end product.

To those skilled in the art to which this invention related, many changes in construction and widely differing embodiments and applications of the invention will suggest themselves without departing from the spirit and scope of the invention. The disclosures and the description herein are purely illustrative and are not intended to be in any sense limiting.

I claim:

1. A method of activating metallic powder to improve its purity and to clean its surfaces from oxide film, moisture, and other impurities so that it becomes more chemically active and also is able to form denser blocks upon compacting or sintering, comprising bombarding the powder in a fluidized state and in a non-oxidizing atmosphere with high energy particles chosen from the class consisting of sub-atomic particles, ions, and molecules.

2. The method of claim 1 wherein the treatment comprises positioning the powder in its fluidized state between a pair of electrodes and applying across said electrodes a high-amperage direct current and a low-amperage alternating current to promote high-frequency discharge among the particles.

3. The method of claim 2 wherein the treatment includes applying a magnetic force at substantially right angles to the electrical force to the powder while it is between the electrodes.

4. The method of claim 2 providing a series of spark discharges to the powder while it is between the electrodes.

5. The method of claim 1 wherein the powder is treated in a zone to which a high frequency pulsating current is applied.

6. The method of claim 1 wherein the powder is bombarded by a beam of electrons.

7. The method of claim 1 wherein the powder is bombarded by a shock wave.

8. The method of claim 1 wherein said atmosphere is an inert gas.

9. The method of claim 1 wherein said atmosphere is a reductive gas.

10. The method of claim 1 wherein said bombardment is supplied by glow discharge of the non-oxidizing atmosphere.

11. The method of claim 1 wherein said bombardment is supplied by corona discharge through the non-oxidizing atmosphere.

12. A method of pulverizing metal while simultaneously activating the resulting metal powder to improve its purity and to clean its surfaces from oxide film, moisture, and other impurities comprising
bombarding metal particles in a non-oxidizing atmosphere with high energy particles chosen from the class consisting of sub-atomic particles, ions, and molecules, and
continuously withdrawing the impurities knocked from said particles by said bombardment, during the bombardment.

13. The method of claim 12 wherein the treatment comprises positioning the metal particles in between a pair of electrodes and applying across said electrodes a high-amperage direct current and a low-amperage alternating current to promote high-frequency discharge among the particles.

References Cited

UNITED STATES PATENTS

| | | | |
|---|---|---|---|
| 2,604,442 | 7/1952 | Lambert et al. | 75—0.5 |
| 2,674,528 | 4/1954 | Beller et al. | 75—0.5 |

L. DEWAYNE RUTLEDGE, Primary Examiner

W. W. STALLARD, Assistant Examiner

U.S. Cl. X.R.

75—211

PO-1050
(5/69)

UNITED STATES PATENT OFFICE
CERTIFICATE OF CORRECTION

Patent No. 3,598,566          Dated August 10, 1971

Inventor(s)     Kiyoshi Inoue

It is certified that error appears in the above-identified patent and that said Letters Patent are hereby corrected as shown below:

On sheet 1 and sheet 2 of the drawings "Filed Dec. 27, 1967" should read -- Filed Dec. 22, 1967 --. Col. 2, line 12, "cles" should read -- cle --. Col. 4, line 5, "powders" should read -- powder --; line 32, "enregy" should read -- energy --. Col. 6, line 60 [last line of Example V] "20" should read -- 200 --.

Signed and sealed this 15th day of February 1972.

(SEAL)
Attest:

EDWARD M. FLETCHER, JR.
Attesting Officer

ROBERT GOTTSCHALK
Commissioner of Patents